United States Patent [19] [11] 4,048,439

Gabus [45] Sept. 13, 1977

[54] CONTROL DEVICE OF A TELETYPEWRITER TO BE USED BY INVALIDS

[75] Inventor: Jean-Claude Gabus, Cornaux, Switzerland

[73] Assignee: Carba S.A., Liebefeld, Switzerland

[21] Appl. No.: 636,704

[22] Filed: Dec. 1, 1975

[30] Foreign Application Priority Data

Dec. 6, 1974 Switzerland ........................ 16209/74

[51] Int. Cl.[2] ........................... G11B 5/02; G08C 1/00

[52] U.S. Cl. ................................ 178/17 C; 340/365 R

[58] Field of Search ............... 178/17, 30, 17 R, 17 C, 178/18; 340/365, 365 R, 365 E, 365 L, 166, 147 R; 197/98; 346/74 M

[56] References Cited

U.S. PATENT DOCUMENTS

| | | | |
|---|---|---|---|
| 3,241,115 | 3/1966 | Maling | 340/147 R |
| 3,693,184 | 9/1972 | Maling | 178/17 C |
| 3,854,131 | 12/1974 | Vanderheiden et al. | 178/17 C |

*Primary Examiner*—Thomas A. Robinson
*Attorney, Agent, or Firm*—Young & Thompson

[57] ABSTRACT

This invention relates to a control device of a teletypewriter to be used by invalids, which comprises at least one control member, a synoptical board and at least one electronic part, said synoptical board comprising at least one line or column, where all the vowels are grouped, and said electronic part being made in such a way that the sign which is printed corresponds, for certain boxes of the board at least, to the combination of the consonant in the chosen box with the vowels in the same column or line of the line or column in which the vowels are grouped.

4 Claims, 4 Drawing Figures

CONTROL DEVICE OF A TELETYPEWRITER TO BE USED BY INVALIDS

The present invention has for its object a control device for a teletypewriter to be used by invalids.

There are numerous devices of this kind, particularly those permitting the control of typewriters by means of only one interruptor, push-button, sound detector or breath detector. The drawback of these devices is the fact that the invalid or the patient or the handicapped person using this machine has to learn a special control code, for example the Morse code. The patient is thus not in a position to use immediately this communicating means. Another drawback of these devices is the slowness of the typing, each letter being the object of a code which has then to be typed separately and successively.

In order to obviate to these drawbacks, a control device of a typewriter has been developed which comprises a synoptic board presenting one block for each sign, letter or cipher to be printed. By means of one or two interruptors or control members, the patient may choose an abscissa or an ordinate, that is a column and a line of the board, then give the order to print the sign, letter or cipher corresponding to the intersection of said line with said column.

FIG. 1 is a block scheme of such a control device, which comprises a printing machine to be controlled 1, a synoptic board 2 as well as an electronic part, this electronic part comprises a logical block 3 and column registers 5, as well as line registers 4, constituting a first plate A, a decoding device constituting a second plate B, as well as line amplifiers 6 and columns amplifiers 7, and logical circuits AND 8 and OR 9 constituting a third plate C.

An input p is provided for controlling the program and two controlling inputs C1 and C2 permitting the user to control the printing machine 1. This printing machine 1 may also be controlled through another keyboard K or by auxiliary means aux.

FIG. 2 shows an embodiment of the synoptic board 2.

Two working modes of this known device are possible.

First mode

Phase 1: The control interruptor C1 is manipulated until a spot of light is displaced horizontally in the desired column.

Phase 2: The interruptor C1 is relaxed and the phase 2 is automatically accomplished, that means that the spot of light is displaced vertically.

Phase 3: One gives an impulse to the control interruptor C1 to realize the chosen function and the spot of light reaches the chosen block.

the cycle may then start again.

Second mode

Phase 1: The interruptor C1 is manipulated until the desired block is reached (horizontal displacement)

Phase 2: An interruptor C2 is manipulated until the desired block is reached (vertical displacement)

Phase 3: The interruptor C1 is again manipulated to realize the desired function.

With such a control device the patient has no need to learn a code; however the speed of execution is very slow, of the order of 20 to 50 letters, ciphers or signs per minute which is insufficient. This is the more insufficient since the invalids or handicapped persons become relatively rapidly tired.

The known systems referred to above are available commercially as "Possum" typewriter control systems of Possum Controls Ltd., 63, Mandeville Road, Aylesbury, Buckinghamshire, England, and are described in greater detail in U.S. Pat. Nos. 3,241,115 and 3,693,184, the disclosure of which is incorporated herein by reference.

The present invention has for its object a control device for a teletypewriter to be used by invalids which permits a much greater printing speed. This control device comprises, as in the device which has just been described, one or more control members, a synoptic board and an electronic part; it distinguishes itself by the fact that the synoptic board comprises at least one line where all the vowels are grouped and by the fact that certain of these vowels at least are also present in more than one column or line, and by the fact that the electronic part is made in such a way that the sign which is printed corresponds, for certain blocks of the board at least, to the combination of the consonant being in the chosen block with the vowel being in the same column or line of the line or column provided for the vowels.

The attached drawings show schematically and by way of example one embodiment of the control device according to the invention.

This machine is able to produce for each printing cycle or control cycle several ciphers at a time. The principle of codage is similar to the previously described machine which is simple. The writing which is generated by this system is of phonetical nature. It is however important to note that the use of normal writing is also possible, the board may contain all the conventional signs. Means are also provided for the writing of ciphers, the zone in which these are provided being usable with only one zero block. For simple machines, it is possible to use a keyboard permitting the simultaneous typing of two letters.

Figure 1:
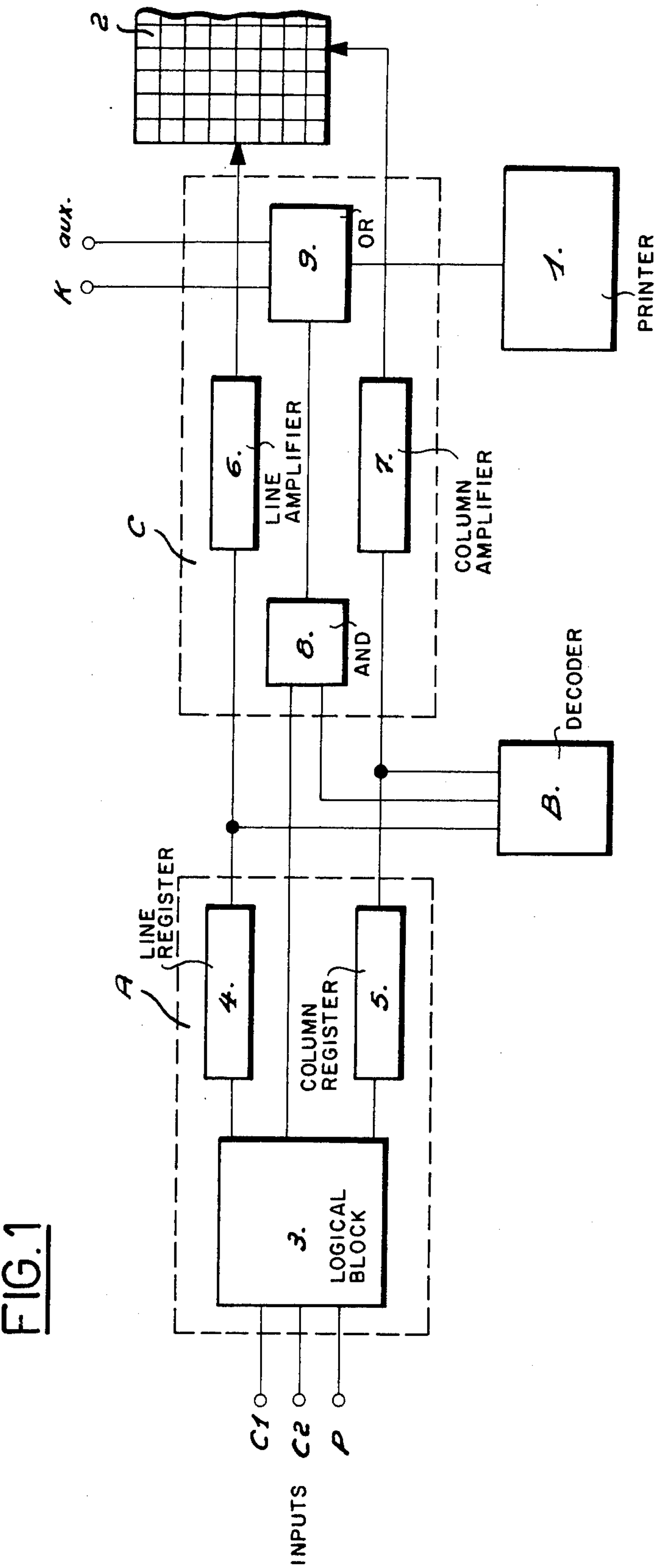
Figure 4:
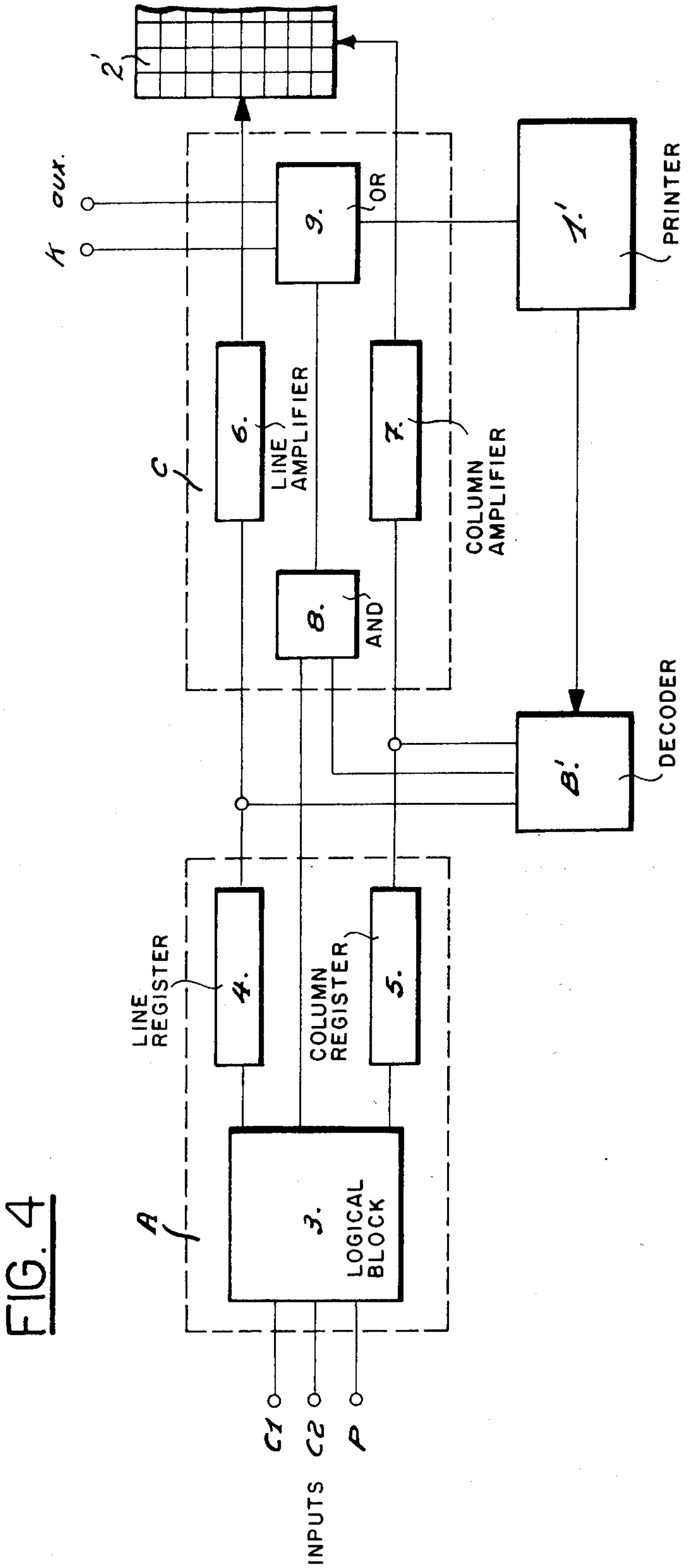
FIG. 4 is a block scheme of the control device.

As can be seen by comparing FIGS. 1 and 4, the structure of this control device is very analogous to that of the one described before, it is different in its conception which is based on the synoptic board 2', with its modification of the realization of the electronic part, particularly of the plate B'. These modifications are however evident to one skilled in the art and will not be described in detail here.

The synoptical board 2' has been specially worked out as a function of the utilization frequency of certain syllables or sounds, since the print obtained with this device is phonetical, in the language used. The arrangement of the board 2' may vary as a function of the language used.

Figure 2:
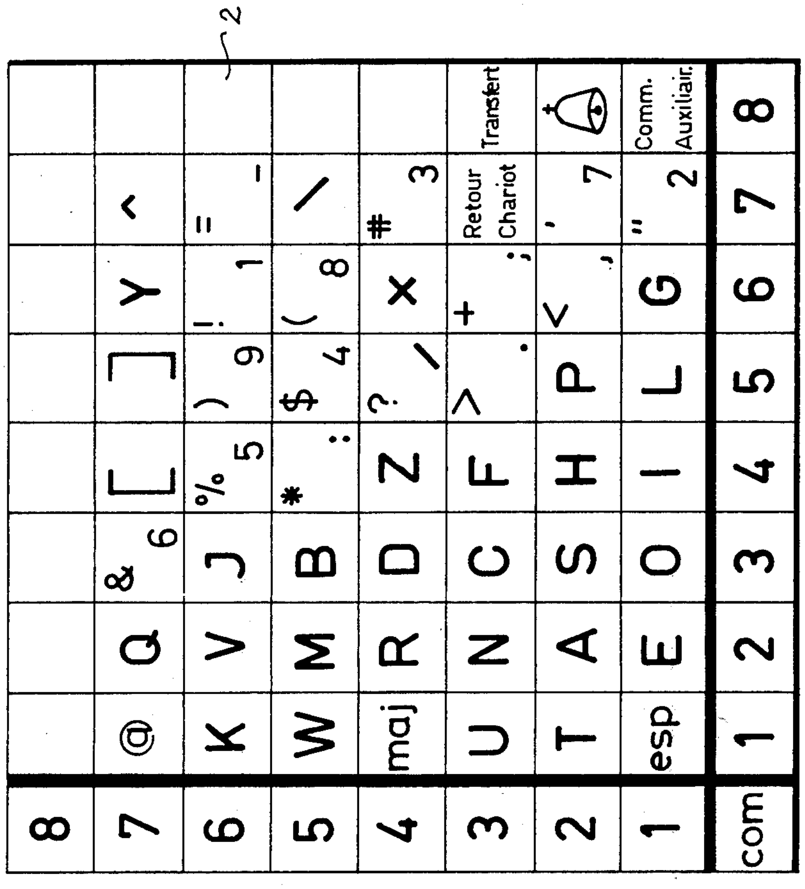
Figure 3:
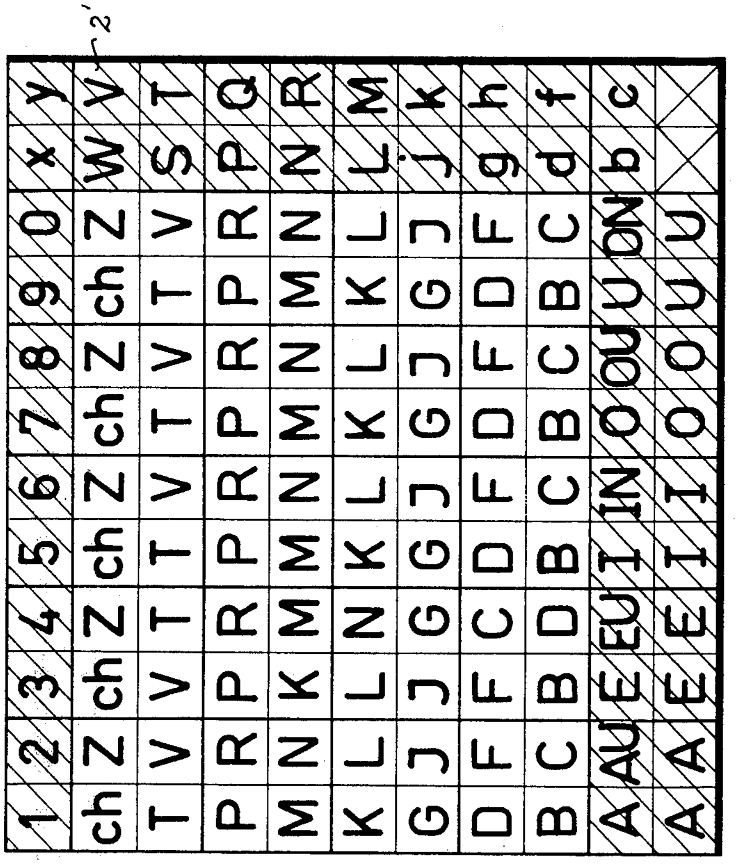
FIG. 3 shows one embodiment of the synoptic board of the control device.

The synoptical board is divided into several zones having different functions. The first line at the top and the two lines at the bottom of the board as well as the two columns at the right of the board are provided to permit the writing of letters and ciphers alone. Thus when the user chooses, with the aid of control members C1, C2, a block which is part of these lines or columns, one prints the letter or the sign shown in the chosen box. This hatched zone of the board functions thus in principle as the synoptic board shown in FIG. 2 except for the second line from the bottom, which, with the exception of the two last boxes, permits printing the print sounds AU, EU, IN, OU, ON for example. Therefore it is necessary that the electronic part of the control device, when one of these boxes is chosen, gives the order to the printing machine to print two letters successively in order to make the desired sound.

The remainder of the synoptic board is original, as well as the electronic part which corresponds to the boxes of this part of the board. In fact, when one box of the board is chosen, in the non-hatched zone of it, orders are given to the printing machine to print the combination of the sign in the box chosen with the vowel in the line at the bottom of the board. One prints thus in only one control cycle at least two letters, a vowel and a consonant constituting a sound. By means of these sounds it is possible to write phonetically which permits a much quicker execution, not only through the reduction of the number of control cycles for the printing of a given number of letters (one prints at least two letters in each cycle) but further due to the use of a phonetical writing which is not an orthographical writing.

Tests have shown that by means of such a control device it was possible to print 120 to 180 signs per minute, which is at least three times more than with the orthographical systems now known.

As one uses many more consonants than vowels, the lower line of the board comprises pairs of boxes presenting the same vowels and the consonants are distributed in two columns corresponding to a same vowel, and this is repeated for each vowel. Therefore it is possible to create all the sounds relative to each vowel.

Thus the synoptical board and the electronic part which is therewith associated enables, by using the hatched zone, to write signs, letters or ciphers per se and thus to permit an orthographical writing; but enables also using the non hatched zone, to write phonetically with a greater speed.

The principle of the typing used in this control device is based on the fact that each box of the synoptical board, or certain boxes of it at least, causes the printing of several characters, (from one to four). The choice of the kind, the number and the order of the printing of these characters is determined by the coding circuit.

After the emission of the first character, electronic circuits wait for a clear-off signal of the printing machine. Then the printing of the next character is controlled automatically and so on until the last character of the given combination corresponding to the chosen box in the synoptical board is printed. When the last character of this combination is printed the electronic circuit comes back into rest position and a new control cycle is possible.

This control device has the same phases of working as the simple orthographic device described before. However one may provide that if the third phase of operation is maintained or repeated one obtains automatically a spacing or a return to line eventually followed by other line returns.

I claim:

1. In a control device of a teletypewriter to be used by invalids, comprising a synoptical board characterized by a plurality of vowels and consonants thereon arranged in lines and columns, at least one control member for selecting and causing the visible indication of a selected said character on said board, and an electronic part for causing a print-out corresponding to a said selected character; the improvement in which said synoptical board comprises as least one line or column in which all the vowels are grouped without the consonants, there being at least one other line or column on the synoptical board in which a plurality of consonants are grouped without the vowels, said electronic part being characterized by causing the print-out of a said vowel in combination with a said consonant upon selection of a said consonant that lies in a column or line perpendicular to said line or column of vowels and in register with said vowel in the last-mentioned line.

2. A device as claimed in claim 1, in which the consonants and vowels are displayed in boxes arranged in said lines and columns, there being a plurality of the same vowel appearing in plural said boxes in said line or column of vowels.

3. A device as claimed in claim 2, there being the same said vowel in two adjacent said boxes in said line or column of vowels, different consonants being displayed in the two columns or lines perpendicular to said line or column of said vowels and in which said two boxes are also disposed.

4. A device as claimed in claim 1, in which said characters are displayed in boxes arranged in said lines and columns, there being diphthongs in certain of said boxes.

* * * * *